United States Patent
Wargo et al.

(10) Patent No.: US 11,295,335 B2
(45) Date of Patent: Apr. 5, 2022

(54) INCENTIVIZING IN-PERSON INTERACTIONS AND CUSTOMER ENGAGEMENT

(71) Applicant: HelloJo, LLC, Atlanta, GA (US)

(72) Inventors: Joseph D. Wargo, Atlanta, GA (US); Joseph Adam Wargo, Athens, GA (US); Alina M. Singer, Atlanta, GA (US); Anatoliy A. Melamud, Johns Creek, GA (US); Frances Marie Wargo, Atlanta, GA (US)

(73) Assignee: HELLOJO, LLC, Atlanta, GA (US)

( * ) Notice: Subject to any disclaimer, the term of this patent is extended or adjusted under 35 U.S.C. 154(b) by 0 days.

(21) Appl. No.: 17/342,686

(22) Filed: Jun. 9, 2021

(65) Prior Publication Data

US 2021/0390576 A1 Dec. 16, 2021

Related U.S. Application Data

(60) Provisional application No. 63/037,978, filed on Jun. 11, 2020.

(51) Int. Cl.
*G06Q 30/02* (2012.01)
*H04W 4/029* (2018.01)
(Continued)

(52) U.S. Cl.
CPC ....... *G06Q 30/0236* (2013.01); *G06K 7/1417* (2013.01); *G06Q 20/3276* (2013.01);
(Continued)

(58) Field of Classification Search
CPC ................................ G06K 9/20; H04N 7/181
(Continued)

(56) References Cited

U.S. PATENT DOCUMENTS 9,118,724 B1  8/2015  Sooriyan et al.
2008/0215348 A1  9/2008  Guldimann et al.
(Continued)

OTHER PUBLICATIONS

Nguyen "Applying gamification to drive persuasion of dating apps: A literature study"; 4050673; SEPAM Information Architecture Information Retrieval; Delft University of Technology; Electrical Engineering, Mathematics and Computer Science.
(Continued)

*Primary Examiner* — Kiet M Doan
(74) *Attorney, Agent, or Firm* — Thomas Horstemeyer, LLP

(57) ABSTRACT

Disclosed are various approaches for incentivizing in-person interactions and customer engagement. These approaches can include obtaining, with a client device, a first indication of attendance of a user at an event. Then, the client device reports the first indication of the attendance of the user to a remote computing device. Later, the client device obtains an additional indication of the attendance of the user at the event and reports the second indication of the attendance of the user to the remote computing device. Meanwhile, the remote computing device can receive the first indication of attendance of a user at an event and the second indication of attendance of the user at the event. The remote computing device can calculate an amount of time that the user attended the event and an amount of reward points based at least in part on the amount of time that the user attended the event. The remote computing device can then award the reward points to the user account of the user.

14 Claims, 14 Drawing Sheets

(51) Int. Cl.
*H04W 4/021* (2018.01)
*G06Q 20/40* (2012.01)
*G06K 7/14* (2006.01)
*G06Q 20/32* (2012.01)

(52) U.S. Cl.
CPC ..... *G06Q 20/4015* (2020.05); *G06Q 30/0208* (2013.01); *H04W 4/021* (2013.01); *H04W 4/029* (2018.02)

(58) Field of Classification Search
USPC .............................. 705/14.5, 7.19; 455/456.3
See application file for complete search history.

(56) References Cited

U.S. PATENT DOCUMENTS

| | | |
|---|---|---|
| 2011/0179064 A1 | 7/2011 | Russo |
| 2011/0238755 A1 | 9/2011 | Khan et al. |
| 2013/0238392 A1 | 9/2013 | Sloan et al. |
| 2015/0244472 A1* | 8/2015 | Poppe .................... H04B 11/00 367/135 |
| 2017/0048901 A1* | 2/2017 | Finch .................... H04W 12/50 |
| 2020/0252743 A1* | 8/2020 | Bellhy ................. H04W 4/029 |

OTHER PUBLICATIONS

Coffee Meets Bagel.
"Fans who check in at Nintendo events become eligible for special rewards"; Jan. 22, 2019; intendo Is Using QR Codes For Event-Specific Rewards | Digital Trends.
"happn—Local dating app"; Jan. 22, 2019 happn—Local dating app—Apps on Google Play.
"Hide'n'Seek"; Jan. 22, 2019; SchoSoft.
"Swarm's new update offers real-world prizes"; Jan. 23, 2019; The Verge.

* cited by examiner

INCENTIVIZING IN-PERSON INTERACTIONS AND CUSTOMER ENGAGEMENT

CROSS-REFERENCE TO RELATED APPLICATIONS

This application claims priority to, and the benefit of, U.S. Provisional Patent Application No. 63/037,978, filed on Jun. 11, 2020 and entitled "INCENTIVIZING IN-PERSON INTERACTIONS AND CUSTOMER ENGAGEMENT," which is incorporated by reference as if set forth herein in its entirety.

BACKGROUND

Individuals regularly attend events, such as sports games, concerts, or other productions. However, not all individuals attend regularly and not all individuals are equally engaged in the event. Moreover, it can be difficult for event hosts or promoters to identity which individuals in attendance are the most engaged, which can be used for determining which users to target with promotions or rewards.

SUMMARY

A social media platform that matches users with similar interests and notifies them when they are in proximity to each other. If the users choose to meet each other, they can accept the match. They only way they can connect through the platform is in person. A user can confirm that they met another user through the exchange of some sort of authentication token using various approaches (e.g., scanning QR codes, inputting PINs, NFC, Bluetooth, etc.). Users can be rewarded with points after they meet.

A social media/marketing platform that rewards users for attending events or visiting specified locations. When users arrive at the location, they can actively authenticate their presence (e.g., enter a password that is posted at event, scan a QR code that is made available at event, connect to an iBeacon or similar microlocation device, etc.). Once their presence is authenticated, they begin earning points. The longer they remain at the event or location, the more points they earn. To encourage users to attend an event or visit a location, data about other users attending the event can be shared. For example, the identities of individual users that may be "matched" to a user may be presented in order to encourage attendance. As another example, the number of attendees may be presented to indicate whether it is a good opportunity to meet people.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for using social media platforms to facilitate in-person interactions between members. To encourage in-person interactions rewards may be provided to members in response to meeting each other in person or attending an event at a predefined location for a minimum interval of time. Meeting more people or staying at an event for a longer period of time can result in additional or larger rewards being awarded to users. To prevent fraud, attendance of members may be verified at periodic intervals using a variety of approaches.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
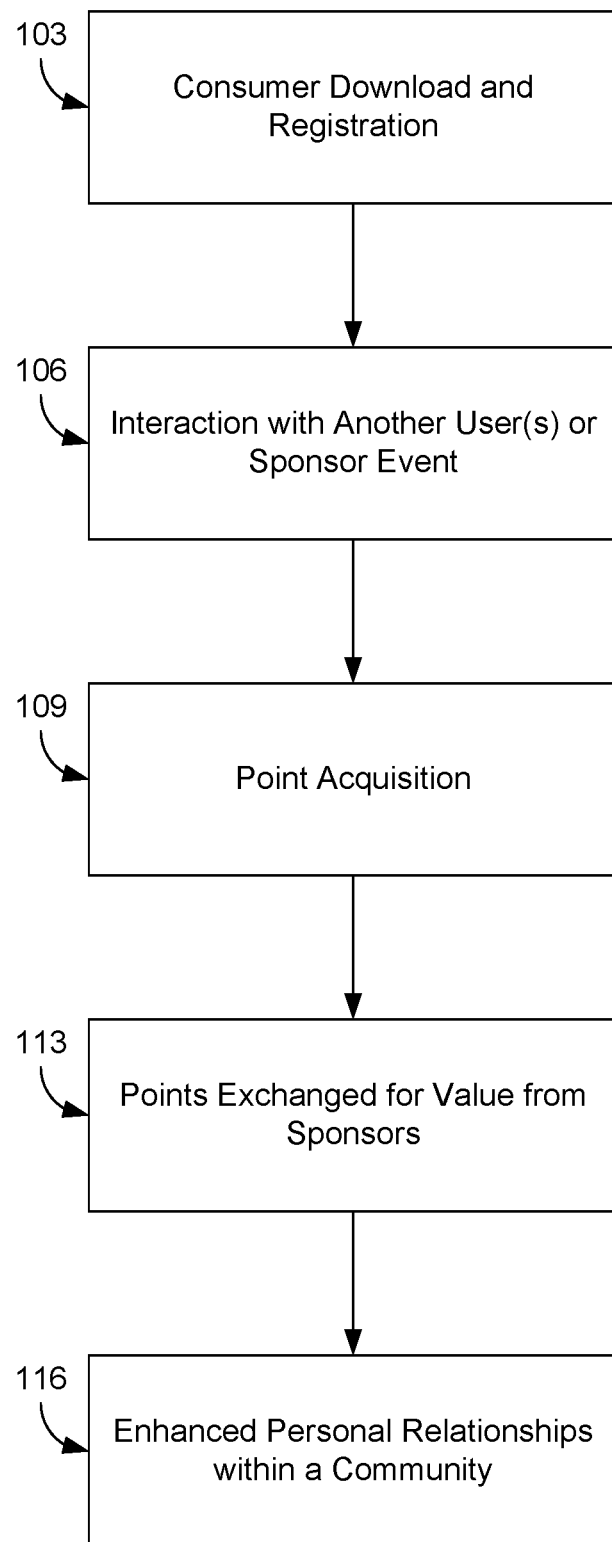
FIGS. 1-4 are flowcharts illustrating one examples of functionality implemented according to various embodiments of the present disclosure.

FIG. 1, illustrates a high-level flow-chart describing the consumer or user experience according to various embodiments of the present disclosure. As an alternative, the flowchart of FIG. 1 can be viewed as steps of a method implemented by a computing device owned or operated by an end-user.

At step 103, a consumer of user first installs a client application on his or her computing device (e.g., mobile phone, tablet, or personal computer). The client application can be used to identify events that the user may be interested in attending, identify individuals that the user may be interested in meeting, or a combination thereof. The client application can also be used to verify that a meeting occurred or that a user attended an event. Accordingly, the client application may prompt or require the user to register with the platform, which can include obtaining a user's name, personal interests, preferences, location, and other personal data that can be used to enrich the user's experience.

Then at step 106, the user can use the client application to interact with other users or attend sponsored events. For example, the user may search for an event that matches one or more of their interests (e.g., a sports viewing party at a local bar or restaurant), and register for or indicate an interest in attending the event. As another example, the user may search for users nearby who share one or more common interests or for users interested in meeting later and share one or more common interests. After the user(s) agree to meet, they may confirm their intent to meet with the client application.

Next at step 109, the client application can obtain a reward on behalf of the user for meeting other users or attending a sponsored event as described at step 106. Generally, the client application will obtain some sort of confirmation that the user has met another user or attended an event they registered for. The confirmation can then be converted into reward points, which can be redeemed for value.

For example, if a user is meeting another user, their proximity to each other could be recorded using geolocation circuits installed on their mobile devices (e.g., smart phones) to verify the meeting. As another example, the users could exchange one-time codes generated by the client application, take photos of QR codes displayed by the client application, or perform a similar operation to verify that they met each other. To verify that the users actually met with or interacted with each other for a predefined amount of time, the time spent in proximity could also be recorded by the client application or the one-time codes or QR codes could be generated only after a predefined amount of time has elapsed.

As another example, if a user is attending an event, various mechanisms could be used to confirm attendance. This could include registering the presence of a wireless beacon associated with the venue using BLUETOOTH or IBEACON technology. Alternatively, the client application could be granted permission to use the microphone of the client device to listen for a prerecorded signal (e.g., an ultrasonic tone included in a television broadcast). As another example, the client application could prompt the user to answer a question (e.g., a trivia question), where the answer is briefly displayed on a television. Failure to answer the trivia question within a short, predefined window of time would prevent the user from searching for the answer to the question to circumvent the system, while users who were present and saw the answer on the television could input the answer in the client application. In other embodiments, the venue where the event is hosted could have QR codes or alphanumeric codes shown on displays (e.g., on a tablet computer screen, computer monitor, or television), which could be scanned by or entered into the client application by the user to verify attendance. The codes could change periodically to measure attendance—the more consecutive codes that a user enters, the longer the user is presumed to have attended.

In response to verification of attendance, the client application can send the attendance information to a server that operates the social media platform. The longer the verified attendance, the more points the user earns.

Then at step 113, the user of the client application can exchange the points earned for value. For example, participating restaurants may offer free food or beverages in exchange for redemption of points through the client application. As another example, sports teams may over free merchandise, events, or experiences in exchange for redemption of points.

As a result of the technical steps 103-113, at step 116 the user of the client application ultimately develops more personal relationships and enhanced personal relationships through face-to-face meetings with other individuals. Moreover, venues that host events or other participating merchants can draw in more customers and convert them into loyal, engaged, long term customers by hosting regular events that the users may be interested in.

Figure 2:
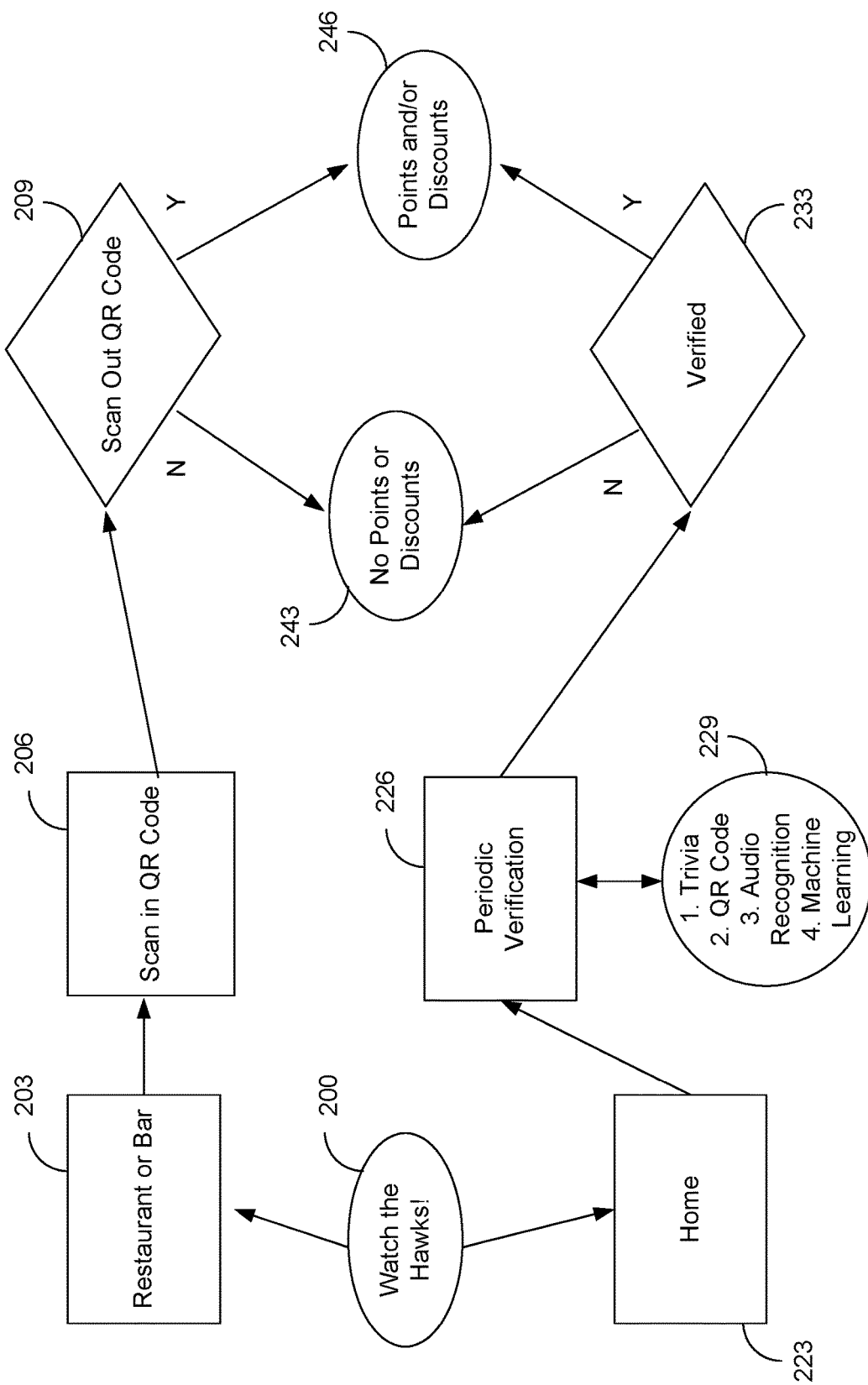

FIG. 2 depicts a flowchart for an example of a use case that might be implemented by a business (e.g., a sports team) to encourage engagement of fans outside of the stadium or arena. As an alternative, the flowchart of FIG. 2 can be viewed as steps of a method implemented by a computing device owned or operated by an end-user. Although the flowchart of FIG. 2 describes the example of a sports team, the method described therein is similarly applicable to other businesses.

Beginning at step 200, a user decides that he or she wants to watch a sports team, such as the ATLANTA HAWKS. The client application may help the user decide what his or her preferred option would be for watching the sports team, such as providing a list of local venues (e.g., restaurants, bars, etc.) that would be showing the game or providing a list of viewing options should the user wish to watch the sports team at home (e.g., channels that will carry the game, websites that will be streaming the game, etc.).

At step 203, if the user wishes to attend a venue (e.g., a bar or restaurant), the user can select or identify which venue he or she plans to attend. The client application may provide the user with an address and/or directions to the venue, and other information (e.g., the time of the event, any special activities before of after the event or coinciding with the event, etc.).

At step 206, the user can check-in or otherwise register his or her attendance. This can be done in a number of ways. In one approach, the user could use a client application installed on his or her smartphone to scan a QR code or input an alphanumeric code when he or she first arrives. The code may be displayed prominently at the venue (e.g., on a monitor, television, or other display) or may be available at the door when the user first arrives. In similar embodiments, the user could also use a wireless transmitter of his or her smartphone (e.g., near-field communication (NFC), BluetTooth, etc.) to transmit an identifier associated with his or her smartphone to a check-in device. In other embodiments, geolocation functionality integrated into a user's smartphone (e.g., global positioning system (GPS) functionality) may be used to track the user's location and determine when the user arrived at the venue. In these implementations, location tracking may be optional or performed on an "opt-in" basis to protect the privacy of users.

While the user is at the venue, he or she can accumulate points or discounts. The longer the user is present, the more points he or she can accumulate. The user's presence can be verified in several ways. For example, at step 209, the user could be required to scan a final QR code or input a final alphanumeric code upon leaving. Similarly, the user could This could be used to indicate that a user has left the venue and should no longer be accumulating points. As an alternative example, the geolocation functionality of a user's smartphone could be used by the client application to detect that a user has left the venue and the time that the user has left the venue. In these implementations, location tracking may be optional or performed on an "opt-in" basis to protect the privacy of users.

If a user's presence at the venue can be verified, then the process proceeds to step 246. Points are awarded to the user, and can be based at least in part on how long the user was at the venue. Similarly, if the user's present cannot be verified (e.g., because the user failed to scan or input a code upon entry or exit), then the user may not be awarded any points.

However, an alternative flow for awarding points may be used if the user chooses to stay at home and watch the event at step 223. For instance, the user's engagement (e.g., presence watching the event) may be verified at periodic intervals at step 226. For example, at the end of each quarter (e.g., the first quarter) or at other natural breakpoints (e.g., at the beginning or end of a commercial break, during a timeout, etc.), a verification process 229 may be used.

The verification process 229 can be performed using various approaches. For example, a trivia question could be displayed in the broadcast, requiring the user to answer with his or her client application within a short, predefined period of time to ensure the user is watching the event and not searching for the answer. As another example, a matrix bar code (e.g., a QR code), answer to a question (e.g., a trivia question), or other image (e.g., mascot) could be displayed on the screen, which the user has a short time to capture on his or her smartphone using the client application. The client application could also be programmed to use the microphone of the user's computing device to hear for and recognize the audio of the venue or an ultrasonic or subsonic tone included in the broadcast or stream of the event. Similarly, the client application could also be programmed to use a camera of the user's computing device to capture images or a sequence of images (e.g., a video) to look for an recognize content being broadcast.

The amount of the user's engagement can be verified at step 233. For example, if a user is only shown to be engaged with a portion of the event (e.g., the first quarter), then the user might be awarded partial credit or a subset of the available award points. If the user is shown to have been engaged throughout the whole program, then the user might receive a larger award of points. Points can be awarded as previously described at steps 243 and 246.

Although these flowcharts describe some of the features and some of the use cases for various embodiments of the present disclosure, these are not the only features of the present disclosure. Additional features are described in the following paragraphs.

For example, the client application could allow for a user to order food and beverages to consume while watching the event. For example, a sports team may wish to allow at home users to order stadium food in order to increase their revenues and allow fans to emulate the stadium experience at home. As another example, partner restaurants may wish to promote their restaurants to viewers by making their menu available through the client application. Accordingly, food ordering could be accomplished in several manners.

First, a list of sponsored restaurants could be displayed within the client application. When user's select a restaurant, they could be redirected to a third-party food delivery website or application (e.g., UBER EATS, GRUBHUB, DOOR DASH, etc.) with which they could place a food order. This approach could be used for partnering restaurants or, if available, vendors who provide food within the stadium itself.

Second, the client application could provide an in-application food ordering system. Accordingly, the client application could display menus for participating restaurants or vendors, obtain a user selection of particular items and their quantities, collect payment from the user, and then submit the order to the restaurant or vendor for fulfillment. This could be implemented for example, using an application programming interface (API) provided by EATSTREET or similar providers.

As another example, stadium experiences such as "kiss cams" or "dance offs" may also be emulated using the client application. In the example of a kiss cam, fans may use the client application to capture photos that can be submitted ahead of time. The best photo may then be selected and displayed during the broadcast or in the client application during the event, with the submitter of the best photo being awarded additional points. Similarly, videos could be submitted of users dancing, with a best video selected and displayed during the event. Alternatively, several videos could be selected and presented to users for voting, with the video receiving the highest number of votes being broadcast during the event and the submitter awarded additional points.

Figure 3:
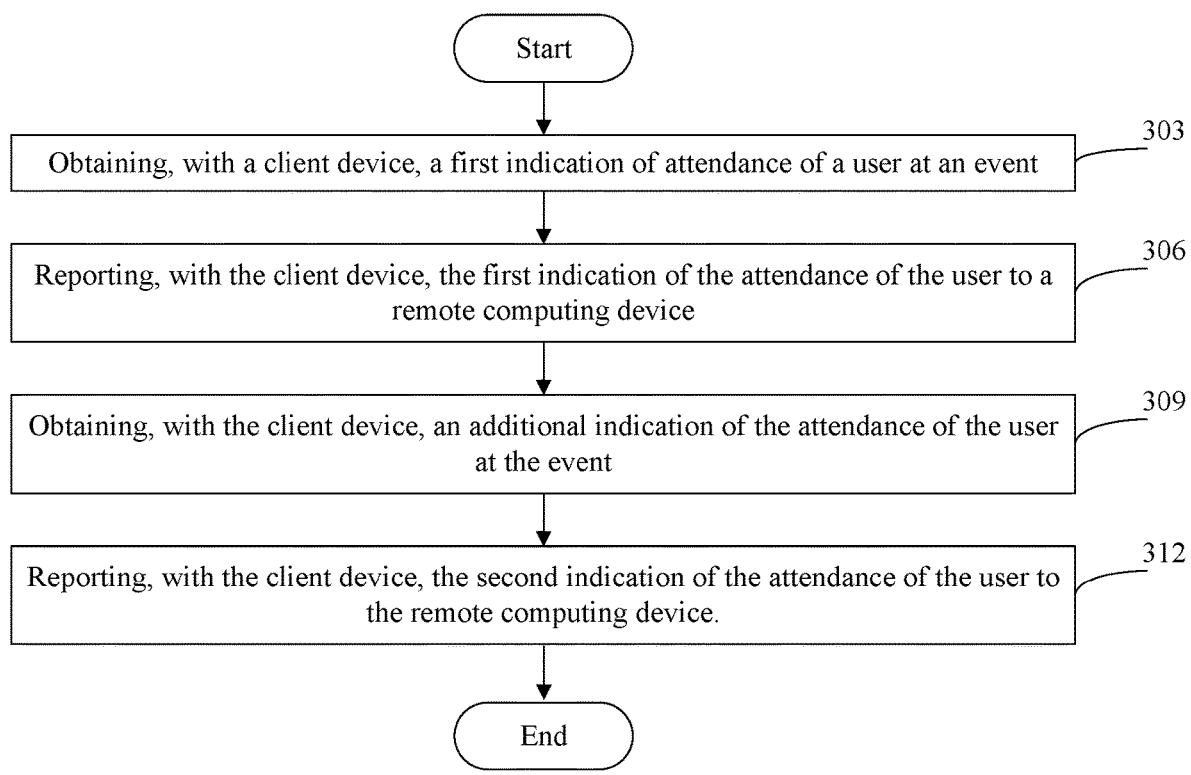

FIG. 3. is a flowchart that further describes one possible implementation of a client application executing on a client device according to various embodiments of the present disclosure.

At step 303, the client application on the client device can obtain a first indication of attendance of a user at an event. This could be accomplished through a variety of approaches. For example, the client application could identify a current location of the computing device using geolocation functionality provided by the computing device; identify a current time; and the first indication of attendance could include both the current location of the computing device and the current time. As another example, the client application could receive a recording captured from a microphone attached to or a component of the computing device. The client application could then process the recording to identify an ultrasonic or subsonic tone that identifies an event being broadcast in the vicinity of the client device. Similarly, the client application could receive a recording captured from a microphone attached to or a component of the computing device. The client application could then perform content recognition on the recording to identify an event capture by the recording. Similar content recognition approaches could also be implemented using a camera or a combination of a camera and a microphone to capture and process video broadcast for the event. In another example, the client application could capture, using a camera of the computing device, a matrix bar code (e.g., a QR code) that specifies an identity of an event; identifies a current time; and the first indication of attendance could include both an identity of the event and the current time. However, any unique image could be used in place of a matrix bar code (e.g., an image of a mascot of a sports team, an image created specifically to represent the event, etc.). Similarly, alphanumeric codes could be displayed instead of a matrix bar code. Likewise, an answer to a question (e.g., a trivia question) could be displayed for the user within the client application executing on his or her client device.

Then, at step 306, the client application could report the first indication of the attendance of the user to a remote computing device (e.g., a server) operated according to various embodiments of the present disclosure. For example, the client application could send a message to the remote computing device that includes the current time and location of client device. As another example, the client application could send a message to the remote computing device that includes the identity of the event encoded in a matrix bar code (e.g., a QR code), the time that the matrix bar code was scanned, and/or any other information encoded within the matrix bar code. Likewise, the client application could send a message that includes the time and location of the client device, as well as the answer to the question or the alphanumeric code displayed on the screen.

Next, at step 309, the client application could obtain a second or additional indication of the attendance of the user. The client application could use the same or similar approaches as those described previously at step 303.

Finally, at step 312, the client application could report the second or additional indication of the attendance of the user to the remote computing device operated according to various embodiments of the present disclosure. The client application could use the same or similar approaches as those previously described at step 306.

Figure 4:
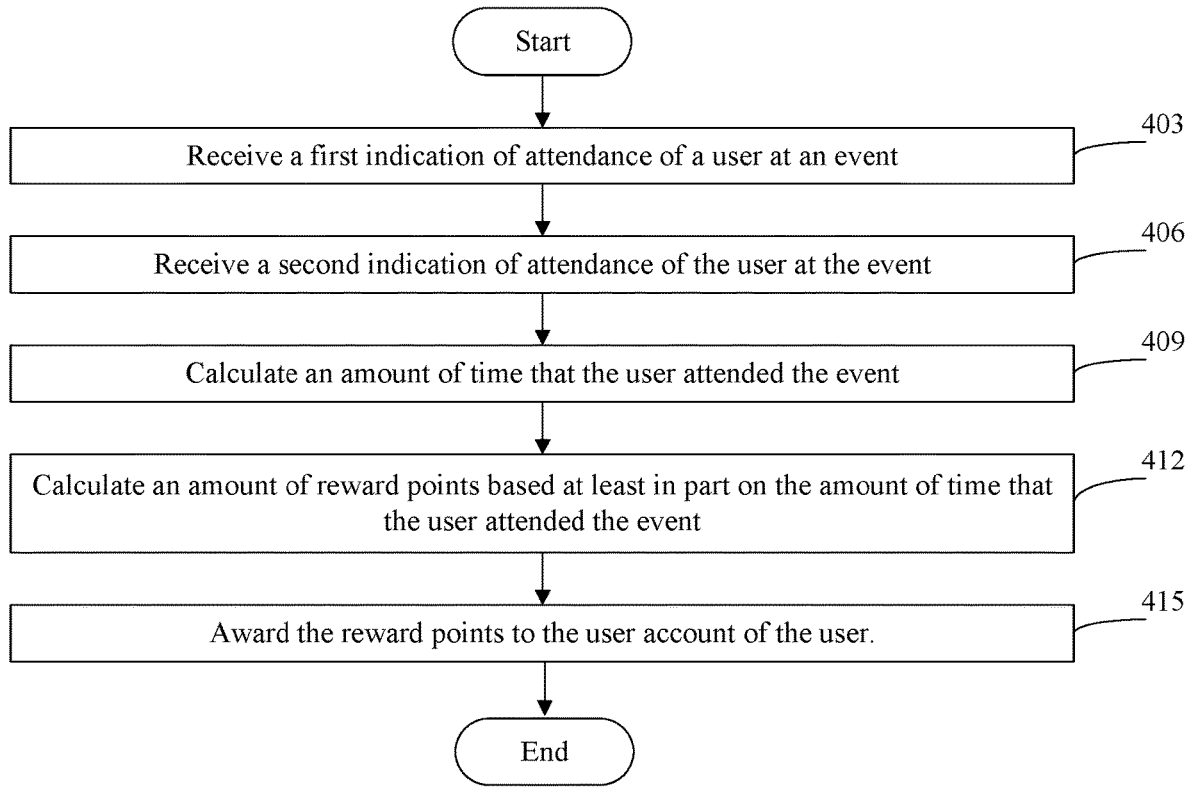

FIG. 4 is a flowchart that further describes one possible implementation of a service executing on a remote computing device (e.g., a server) according to various embodiments of the present disclosure.

First, at step 403, the service receives from a client application a first indication of attendance of a user at an event. For example, the service could receive the current time and location of the client device and determine whether the current time and location of the client device corresponds to a location of an event. In response, the service could determine that the client device was located at a stadium, theatre, concert hall, park, or other venue during the time that an event is occurring at the venue based at least in part on the current time and location provided by the client device. As another example, the service could receive a message from the client device that includes the identity of the event encoded in a matrix bar code (e.g., a QR code) presented at the event, the time that the matrix bar code was scanned, and/or any other information encoded within the matrix bar code. The information encoded in the matrix bar code would identify the event that the client device was at and the time that the client device was present. In other implementations, the service could receive an alphanumeric code or answer to a question, as well as a timestamp and a location of the client device.

Then, at step 406, the service receives a second indication of attendance of the user at the event. This could be a subsequent location and time provided by the client device, information from a second matrix bar code scanned by the client device at the event, alphanumeric code or answer to a question, etc.

At step 409, the service can then calculate an amount of time that the user attended the event. The calculation could be made by calculating the difference between the time included in the first indication of attendance and the second indication of attendance after verifying or authenticating each of the indications of attendance.

At step 412, the service can then calculate an amount of reward points to award the user based at least in part on the amount of time calculated at step 409. The reward points can be calculated according to a variety of approaches. For example, the reward points could be calculated based on a schedule or formula (e.g., where a user could earn X points per increment of time). The schedule or formula could also include bonuses or modifiers, such as awarding extra points for consecutive periods of time or for the status of the user (e.g., season ticket holders being awarded additional points).

Finally, at step 415, the service can award or deposit the reward points calculated at step 412 in an account associated with the user. In some implementations, the account associated with the user could be an account created by the user to use the client application. In other implementations, the account associated with the user could be an account provided by a partner entity, such as an airline frequent flyer rewards program or a hotel rewards program. Similarly, the account associated with the user could be an account provided by a merchant (e.g., for electronic commerce purchases through the merchant's website), and the rewards could be deposited into the user's account to be redeemed as a cash credit or discount for subsequent purchases with the merchant.

Figure 5A:
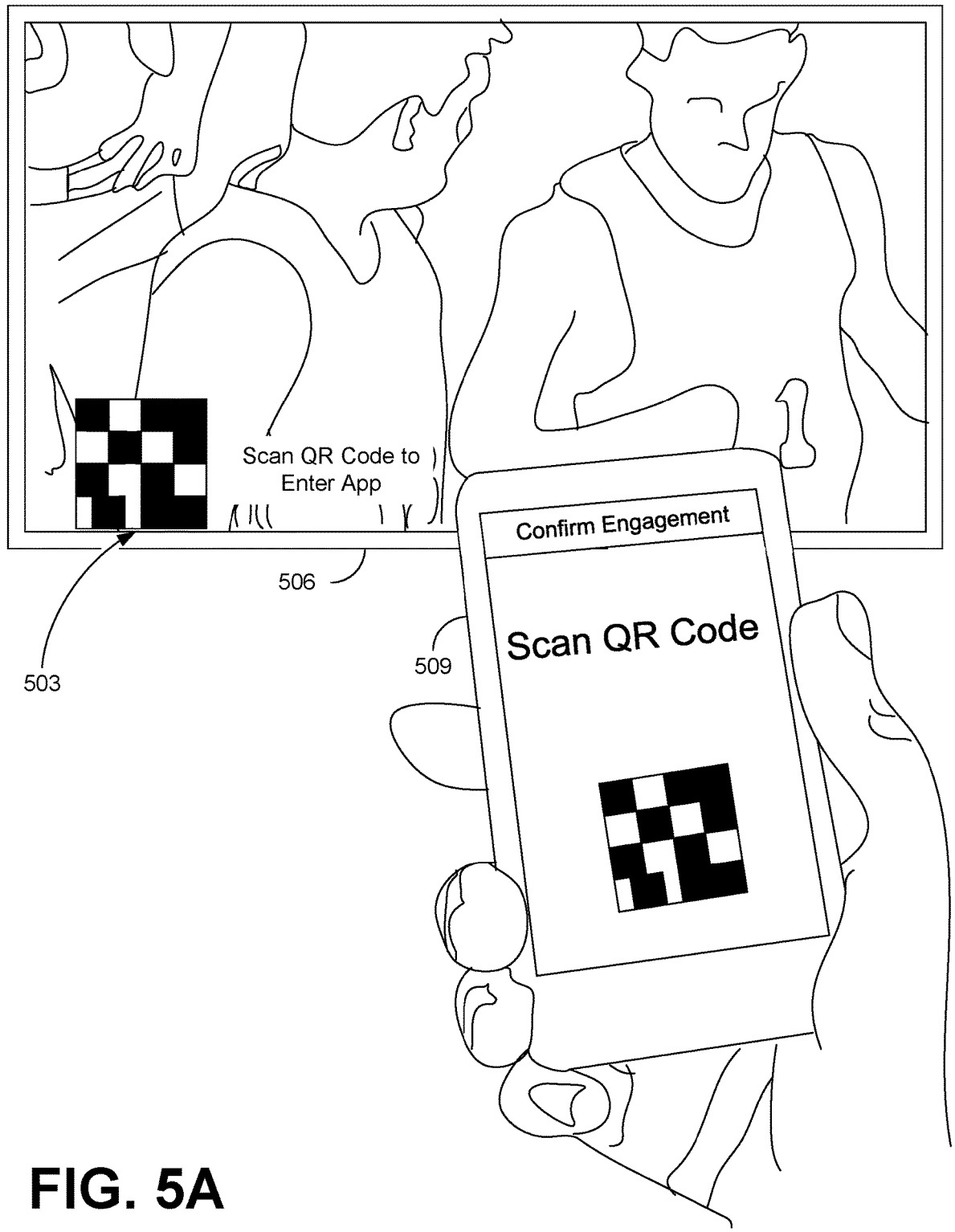
FIGS. 5A-5C illustrate example implementations of various embodiments of the present disclosure.

FIG. 5A depicts a graphical example of how user engagement could be measured according to various embodiments of the disclosure as previously described. In the depicted scenario, matrix bar codes (e.g., quick response (QR) codes) can be depicted at regular intervals for a user to scan to confirm their presence at an event and/or encourage their engagement with the event. For example, a QR code 503 could be displayed on the screen of a television 506 at periodic intervals during an event, such as a sports game, concert, a movie, a live broadcast, etc.

In this example, the user could then use his or her client device 509 to scan the QR code 503. Scanning the QR code 503 would then cause the client application on the client device 509 to open and record that the user had scanned the QR code 503 in order to reward the user for his or her presence and/or engagement. Once scanned, the client device 509 could send information about the presence of the user to a remote computing device, as previously described in the discussion of FIGS. 1-4.

Accordingly, in some implementations, the QR code 503 could encode various types of information that could be used to track user engagement and/or reward a user. This could include the time that the QR code 503 was displayed or scheduled for display, the event at which the QR code 503 was displayed, etc. In some implementations, the QR code 503 could be generated dynamically when it is displayed, so that it includes the most accurate information. In other implementations, the QR code 503 could be pre-rendered and provided to the event host or broadcaster for display at pre-arranged or pre-determined times.

Figure 5B:
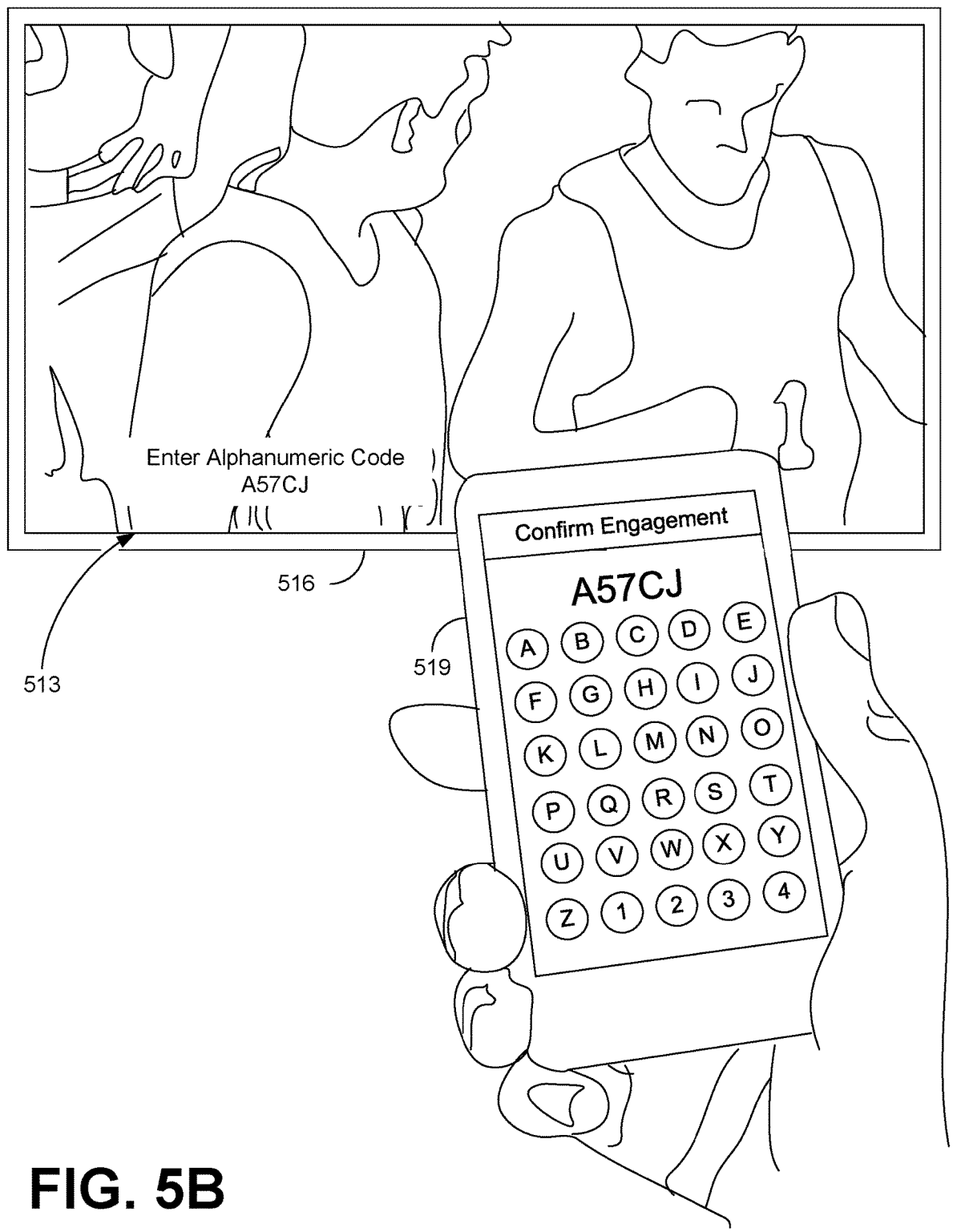

FIG. 5B depicts a graphical example of how user engagement could be measured according to various embodiments of the disclosure as previously described. In the depicted scenario, an alphanumeric code can be depicted at regular intervals for a user to read and input using their client device to confirm their presence at an event and/or encourage their engagement with the event. For example, an alphanumeric code 513 could be displayed on the screen of a television 516 at periodic intervals during an event, such as a sports game, concert, a movie, a live broadcast, etc.

In this example, the user could then use his or her client device 519 to enter or input the alphanumeric code 513 (e.g., using a keyboard or on screen keyboard). Entering the alphanumeric code 513 would then cause the client application on the client device 519 to send information about the presence of the user to a remote computing device, as previously described in the discussion of FIGS. 1-4.

Figure 5C:
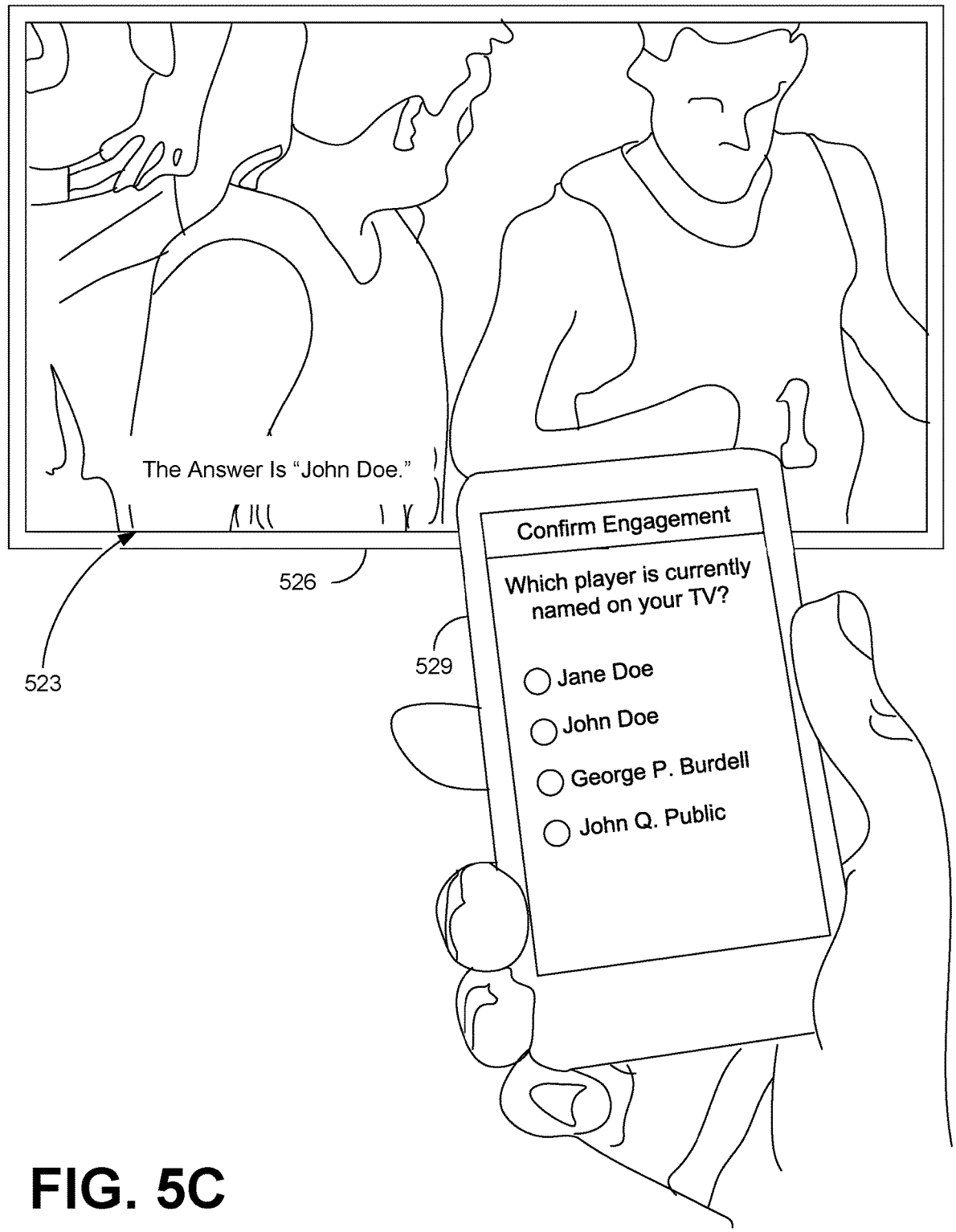

FIG. 5C depicts a graphical example of how user engagement could be measured according to various embodiments of the disclosure as previously described. In the depicted scenario, the answer to a question can be depicted at regular intervals for a user to read and input using their client device to confirm their presence at an event and/or encourage their engagement with the event. For example, an answer 523 to question could be displayed on the screen of a television 526 at periodic intervals during an event, such as a sports game, concert, a movie, a live broadcast, etc. For example, an answer 523 to a trivia question could be displayed on the television 526. However, to prevent cheating or fraud from users researching the trivia question without being engaged in the event displayed on the television 526, the answer 523 could be an answer 523 to a question that is unsearchable (e.g., which player is currently named on the television 526).

In this example, the user could then use his or her client device 529 to enter or input the answer 523 (e.g., using a keyboard or on screen keyboard) to the question. Entering the answer 523 would then cause the client application on the client device 529 to send information about the presence of the user to a remote computing device, as previously described in the discussion of FIGS. 1-4.

Figure 6A:
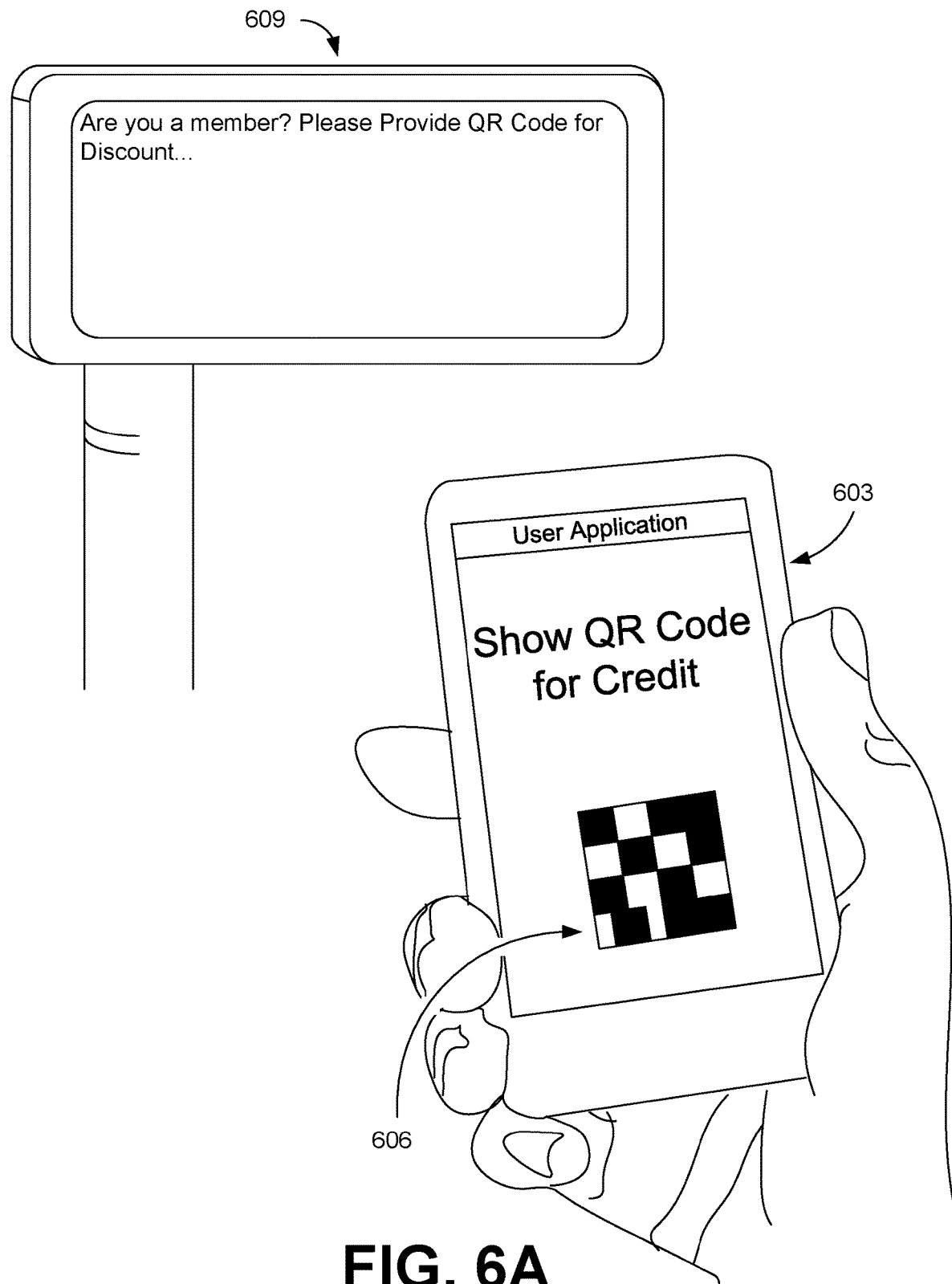
FIGS. 6A and 6B illustrate example implementations of various embodiments of the present disclosure.

FIG. 6A depicts a graphical example of how a user might redeem points awarded according to the various embodiments of the present disclosure. In the depicted scenario, a user of a client device 603 could open a client application and select a number of rewards or awards points to apply towards a purchase with the merchant. The client application could then render a matrix bar code, such as a QR code 606, which the user could then present to a payment terminal 609 as part of a transaction. The payment terminal 609 could use a built-in optical scanner or reader scan the QR code 606. The QR code 606 could include a number of data points, such as an account identifier for the user, and an amount of previously acquired rewards points the user wishes to redeem or otherwise apply to his or her purchase, and a link to the service used by the user.

Upon reading and decoding the QR code 606, the merchant could authenticate whether the user is a current user of the service and has the amount of awards or rewards points available that are encoded in the QR code 606. For example, the merchant could send a request to the service that includes the account identifier of the user and/or the amount of points to redeemed. If the service confirms that the account identifier is for a valid user account, and that the user account has at least the amount of points available that are encoded in the QR code 606, then the merchant could provide a discount to the transaction based at least in part on the amount of points. Once the merchant completes the transaction with the user, the merchant could notify the service, which could deduct the points from the current balance associated with the account identifier of the user.

Figure 6B:
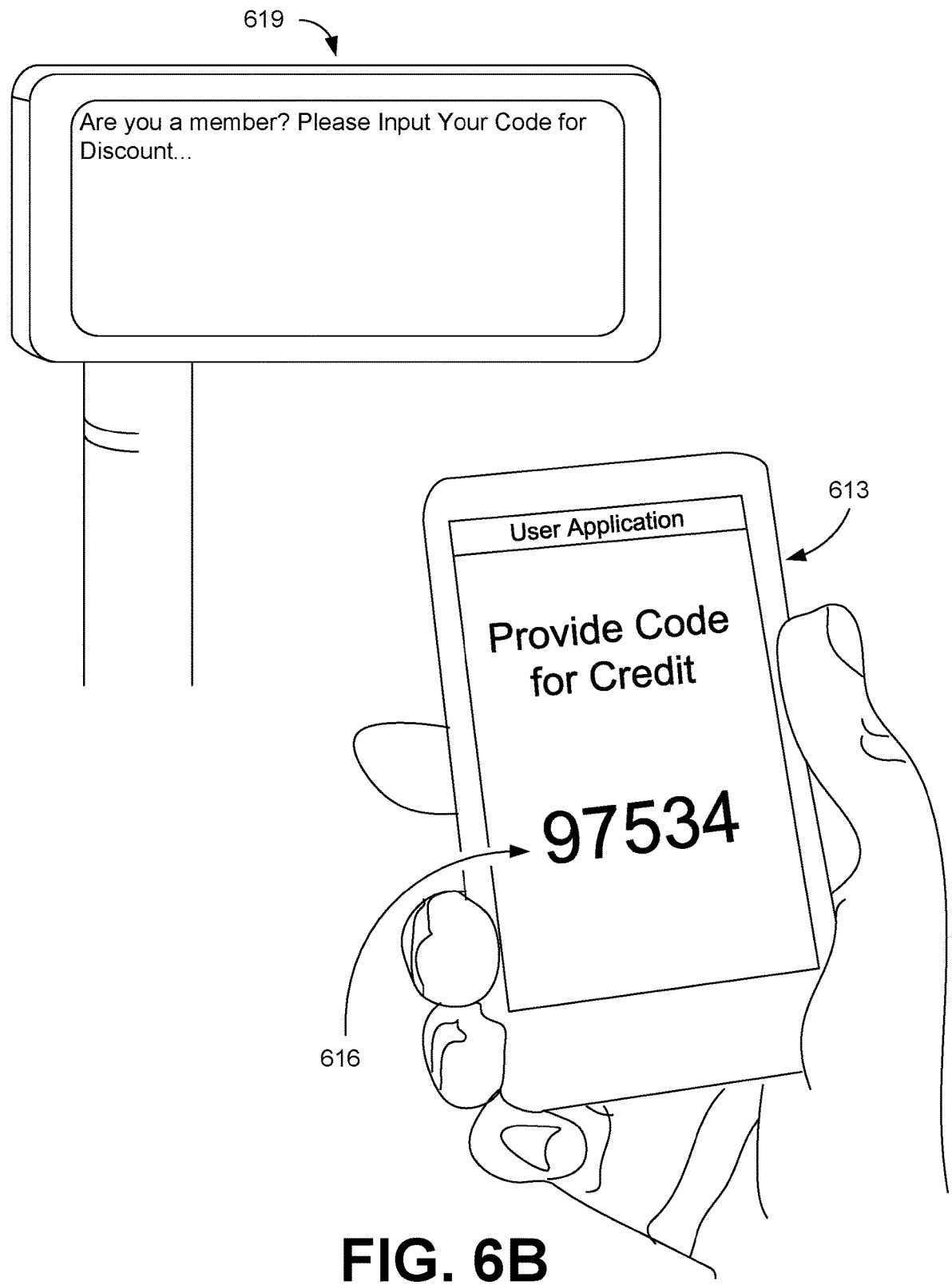

FIG. 6B depicts a graphical example of how a user might redeem points awarded according to the various embodiments of the present disclosure. In the depicted scenario, a user of a client device 613 could open a client application and select a number of rewards or awards points to apply towards a purchase with the merchant. The client application could then display a verification code 616, such as an alphanumeric code, which the user could then enter in a payment terminal 619 as part of a transaction (e.g., by typing the code using a keypad of the payment terminal 619). Additional information about the transaction could then be provided, such as the amount Upon receiving the verification code 616, the merchant could authenticate whether the user is a current user of the service and has the specified amount of awards or rewards points available. For example, the merchant could send a request to the service that includes the account identifier of the user, the verification code 616, and/or the amount of points to redeemed. If the service confirms that the account identifier is for a valid user account, that the verification code 616 is valid (e.g., was previously presented to the user), and that the user account has at least the specified amount of points available, then the merchant could provide a discount to the transaction based at least in part on the amount of points. Once the merchant completes the transaction with the user, the merchant could notify the service, which could deduct the points from the current balance associated with the account identifier of the user.

It should be noted that other approaches could also be used in addition too or in combination with the approaches illustrated in FIGS. 6A and 6B. For example, the user could user a wireless transmitter of his or her client device (e.g., an NFC transmitter, BLUETOOTH transmitter, etc.) to transmit the verification code 616 (e.g., if the verification code were a token) and other relevant information to the payment terminal 619.

FIGS. 7A-7D depict another graphical example of how a user might redeem points awarded according to various embodiments of the present disclosure. In the graphical examples of FIG. 7A-7D, the user could redeem rewards points by transferring them to a partner merchant for an account credit or balance. However, a similar process could be used to transfer points to a partner program that uses points (e.g., a frequent flyer miles program).

Figures 7A, 7B:
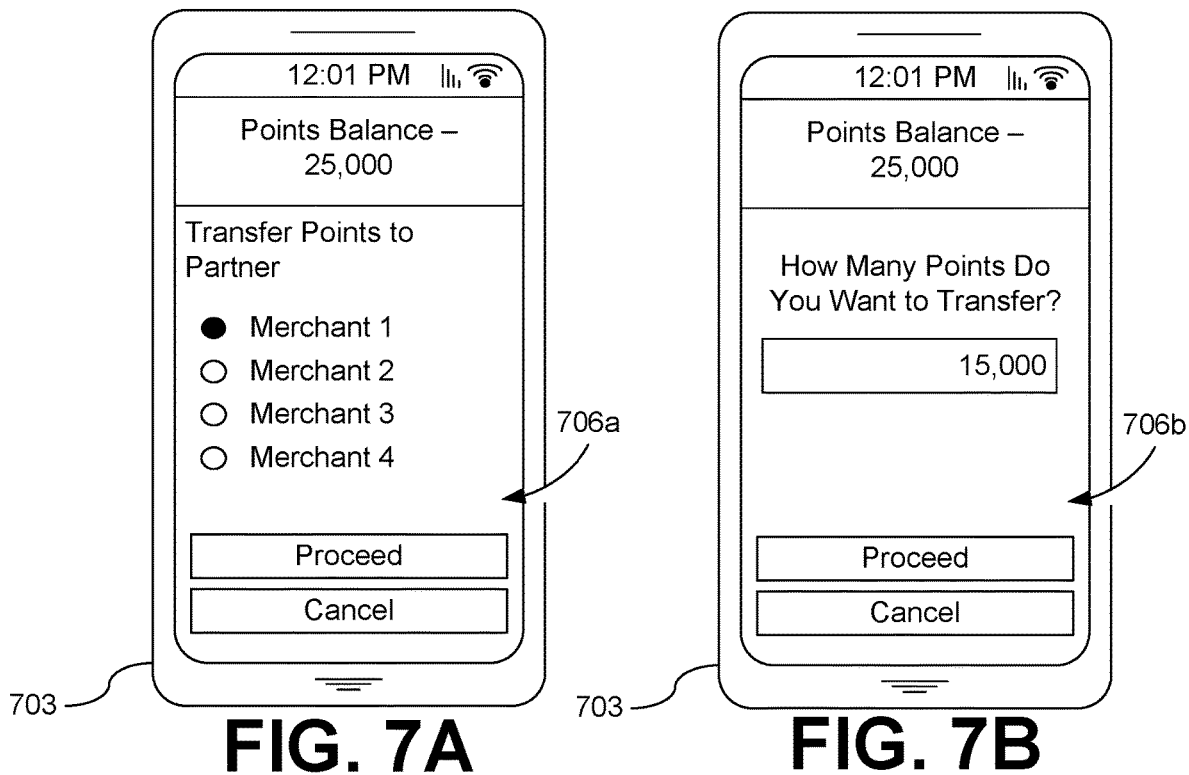
FIG. 7A-7D illustrate example implementations of various embodiments of the present disclosure.

For example, as depicted in FIG. 7A, a user of a client device 703 could login to his or her client application and initiate a transfer of points to a partner merchant. Accordingly, user interface 706a could then be presented to the user on the display of the client device 703. The user interface 706a could present a list of merchants that the user could transfer some or all of his or her accumulated or accrued points. In some instances, the user interface 706a could also display the current points balance of the user.

Figures 7C, 7D:
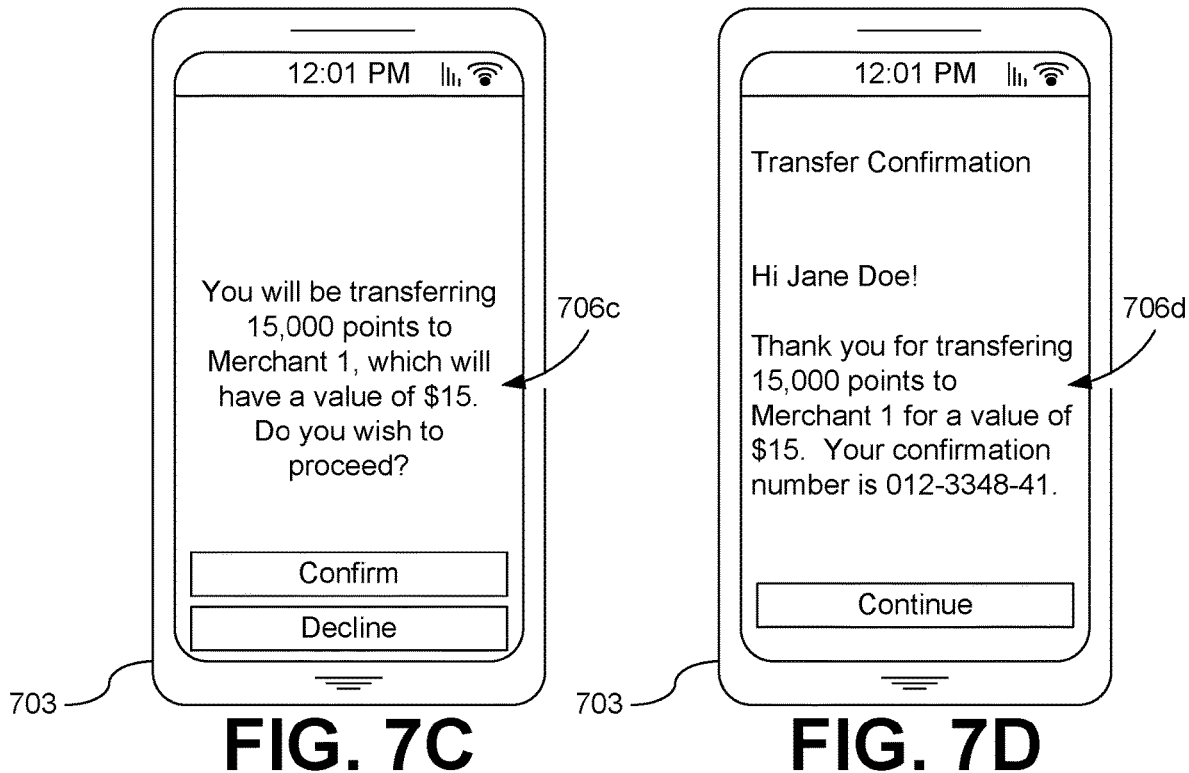

Once the user has confirmed or selected the merchant to which the user wishes to transfer points, the user could be presented with user interface 706b, as depicted in FIG. 7B. After the user has selected or input the number of points to be transferred in user interface 706b, the user could then confirm the amount of points to transfer in user interface 706c, as depicted in FIG. 7C. In some implementations, the user interface 706c could also inform the user of the value of the points transfer to the partner merchant previously selected in user interface 706a. The user can then confirm or decline within user interface 706c to proceed with the points transfer. After transferring the points, a confirmation message can then be displayed to the user in user interface 706d, as depicted in FIG. 7D.

Figure 8A:
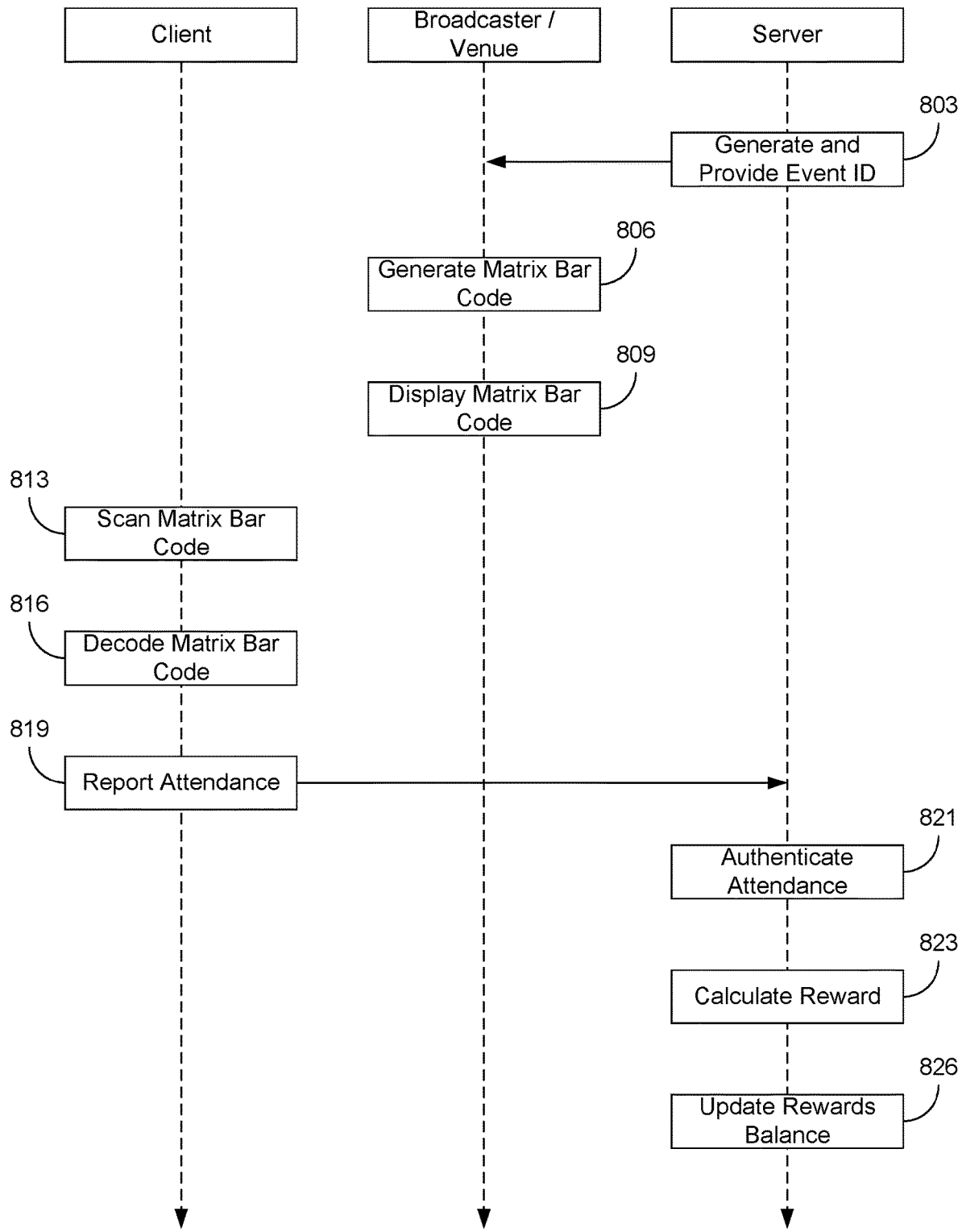
FIGS. 8A and 8B are sequence diagrams illustrating examples of the interactions between the various components of the various embodiments of the present disclosure.

FIG. 8A depicts a sequence diagram illustrating an example implementation of various embodiments of the present disclosure. Here, FIG. 8A depicts a client, a server, and one or more systems operated by a broadcaster or venue operating together to measure user engagement and/or attendance.

At block 803, the server can generate an event identifier and provide the event identifier to the broadcaster or venue. The event identifier can be any identifier that uniquely identifies an event with respect to other events. In some implementations, the event identifier could be a single identifier, such as a unique number or alphanumeric character sequence, such as a serial number or code. In other implementations, the event identifier could be a tuple of data that, together, uniquely represent the event (e.g., the event name, location, date, and/or time).

Then at block 806, the broadcaster or venue can, at periodic intervals generate a matrix bar code (e.g., a QR code) for display. The matrix bar code can include information such as the event identifier previously received at block 803, and other information such as a timestamp reflecting the date and/or time that the matrix bar code was generated or displayed.

Then, at block 809, the broadcaster or venue can display the matrix bar code generated previously at block 806. For example, at a concert or in a sports arena, the venue could generate a matrix bar code and display it on a large display for attendees to view. As another example, a broadcaster could generate and display the matrix bar code in a television feed that television viewers could see on a television screen showing the broadcast.

Next, at block 813, the user could open his or her client application and scan the matrix bar code displayed at block 809 by the broadcaster or venue. For example, the client application could make use of a camera or other optical sensor to scan or otherwise capture an image of the matrix bar code.

In response to scanning the matrix bar code, the client application could decode the information stored in the matrix bar code at block 816. As part of the decoding process, the client application could identify the event identifier for the event and the timestamp included in the matrix bar code.

Then, at block 819, the client application could report the attendance of the user to the server. For example, the client application could provide the event identifier and/or timestamp from the decoded matrix bar code to the server. The client application could also provide the location of the client device at the time the matrix bar code was scanned and/or the time at which the matrix bar code was scanned.

Subsequently, at block 821, the server could authenticate attendance of the user of the client device. This could be done using a variety of approaches. For example, the server could confirm that the event identifier provided by the client matches a known or valid event identifier. As another example, the server could confirm that the time that the client reported scanning the matrix bar code is within a predefined window after the timestamp included in the matrix bar code. In some instances, the server could compare the reported location of the client device at the time the matrix bar code was scanned to the location where the event occurred. Other approaches could also be used according to various embodiments or implementations of the present disclosure.

If the user's attendance is authenticated at block 821, then the server can calculate an award for the user at block 823. The reward can be calculated using a variety of approaches. For example, each time a user reports his or attendance, a predefined number of points could be awarded to the user. Additional points could be awarded based on other factors. For example, additional points could be awarded for consecutive attendance reports (e.g., as a reward for a user who attended an uninterrupted segment of an event or the whole event). As another example, additional points could be awarded based on the status of the user (e.g., additional points could be awarded for season ticket holders). Other approaches could also be used to calculate the amount of rewards according to various embodiments of the present disclosure.

Then, at block 826, the server can update the rewards or awards balance of the user to include the additional award or reward value calculated at block 823. In some implementations, this could involve adding points to the balance of an existing account. In other implementations, this could involve awarding points to a user account with a partner program, as previously described. In those implementations, a message could be sent to a computer operated by the partner program indicating the amount of awards owed to the user, such as an amount of frequent flyer miles owed to a user.

Figure 8B:
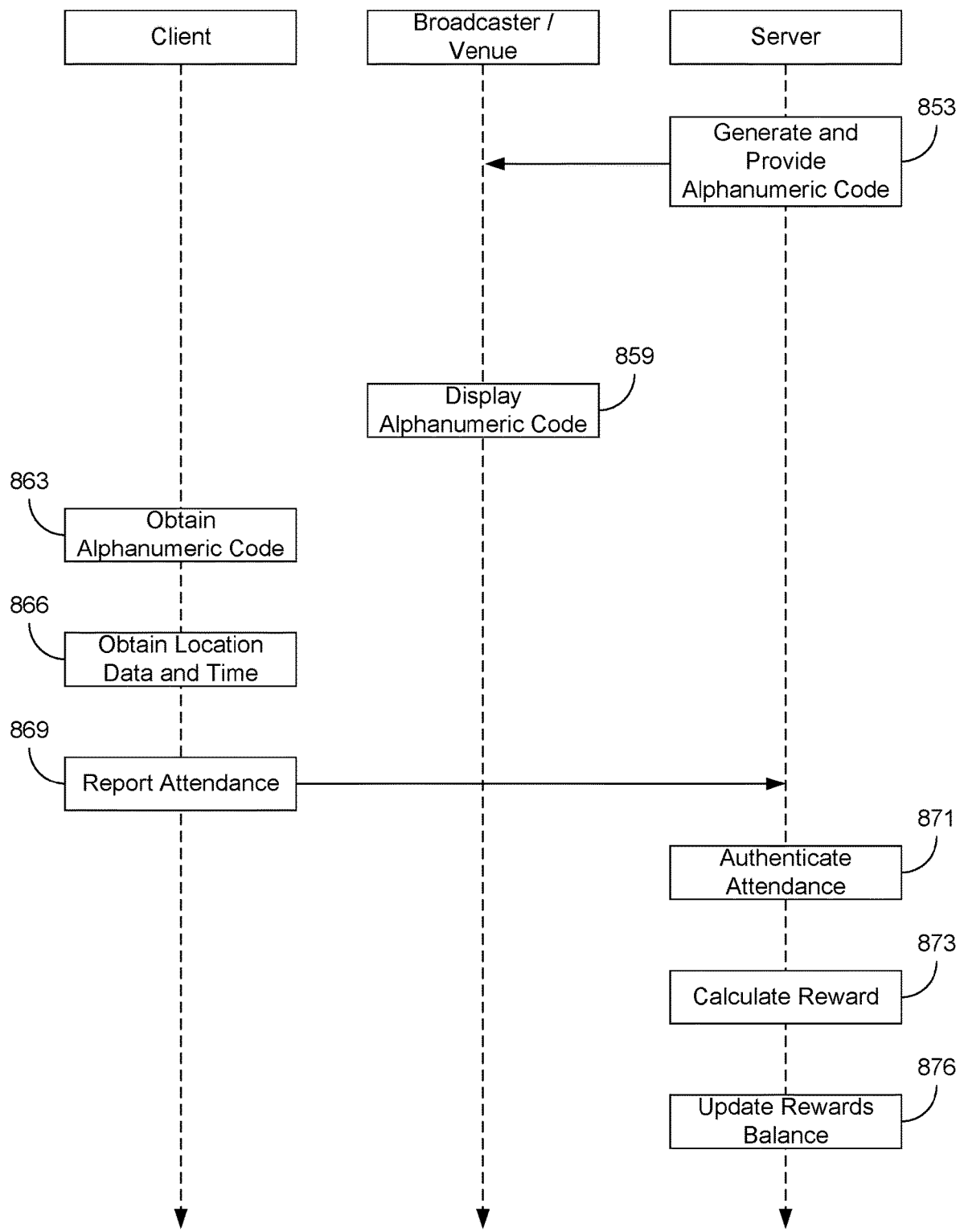

FIG. 8B depicts a sequence diagram illustrating an example implementation of various embodiments of the present disclosure. Here, FIG. 8B depicts a client, a server, and one or more systems operated by a broadcaster or venue operating together to measure user engagement and/or attendance.

At block 853, the server can generate and provide an alphanumeric code to the broadcaster or venue. As part of this operation, the alphanumeric code may be stored in associated with the event (e.g., by linking the alphanumeric code to an event identifier that uniquely identifies the event with respect to other events). In some implementations, the alphanumeric code could be any random combination of letters and numbers.

Then, at block 859, the broadcaster or venue can display the alphanumeric code generated previously at block 853. For example, at a concert or in a sports arena, the venue could display the alphanumeric code on a large display for attendees to view. As another example, a broadcaster could generate and display the alphanumeric code in a television feed that television viewers could see on a television screen showing the broadcast.

Next, at block 863, the user could open his or her client application and input the alphanumeric code displayed at block 859 by the broadcaster or venue. For example, the user could type the alphanumeric code using a keypad, keyboard, or on screen keypad or keyboard. In some implementations, however, the client application could make use of a camera or other optical sensor to scan or otherwise capture an image of the alphanumeric code. In these implementations, the client application could then perform optical character recognition (OCR) to identify the characters of the alphanumeric code.

Next, at block 866, the client application could then obtain the current location of the client device and the current time. For example, the client application could obtain the current position from geolocation circuitry (e.g., a global positioning system (GPS) receive) installed on the client device. Likewise, the client application could obtain the current time from the clock of the client device.

Then, at block 869, the client application could report the attendance of the user to the server. For example, the client application could provide the alphanumeric code, current location of the client device, and the current time to the server.

Subsequently, at block 871, the server could authenticate attendance of the user of the client device. This could be done using a variety of approaches. For example, the server could confirm that the alphanumeric code received from the client matches an alphanumeric code associated a known or valid event identifier. As another example, the server could confirm that the time that the client reported scanning the matrix bar code is within a predefined or known window of (e.g., date and/or time that the event was occurring). In some instances, the server could compare the reported location of the client device at the time the alphanumeric code was provided to the location where the event occurred. Other approaches could also be used according to various embodiments or implementations of the present disclosure.

If the user's attendance is authenticated at block 871, then the server can calculate an award for the user at block 873. The reward can be calculated using a variety of approaches. For example, each time a user reports his or attendance, a predefined number of points could be awarded to the user. Additional points could be awarded based on other factors. For example, additional points could be awarded for consecutive attendance reports (e.g., as a reward for a user who attended an uninterrupted segment of an event or the whole event). As another example, additional points could be awarded based on the status of the user (e.g., additional points could be awarded for season ticket holders). Other approaches could also be used to calculate the amount of rewards according to various embodiments of the present disclosure.

Then, at block 876, the server can update the rewards or awards balance of the user to include the additional award or reward value calculated at block 873. In some implementations, this could involve adding points to the balance of an existing account. In other implementations, this could involve awarding points to a user account with a partner program, as previously described. In those implementations, a message could be sent to a computer operated by the partner program indicating the amount of awards owed to the user, such as an amount of frequent flyer miles owed to a user.

Although the sequence diagram of FIG. 8B describes the use of an alphanumeric code, it should be noted that the same process could be used for any kind of text authentication. For example, instead of using alphanumeric codes, the sequence diagram of FIG. 8B would be similarly applicable when using answers to questions to validate user attendance or engagement.

Figure 9A:
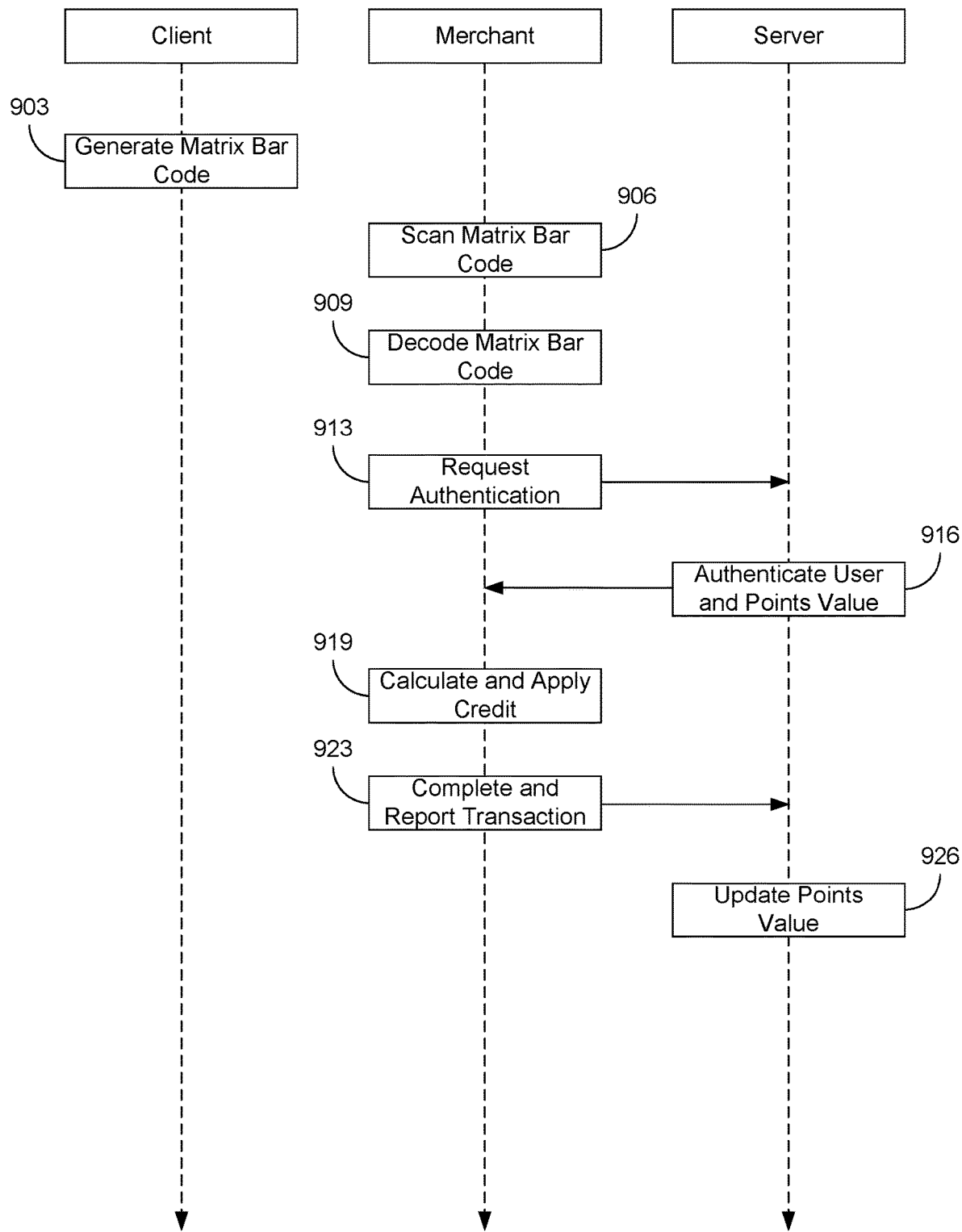
FIGS. 9A and 9B are sequence diagrams illustrating examples of the interactions between the various components of the various embodiments of the present disclosure.

FIG. 9A depicts a sequence diagram illustrating an example implementation of various embodiments of the present disclosure. Here, FIG. 9A depicts a client, a server, and one or more systems operated by a merchant operating together to allow a user to redeem points earned using one or more of the previously described approaches.

Beginning at block 903, the client can generate a matrix bar code (e.g., a QR code) for use in a transaction with a merchant. The matrix bar code can include information such as an amount of rewards points to be used for the transaction and an account identifier that identifies the user account from which the rewards points should be deducted. Once generated, the client can then display the matrix bar code on a screen of the client device.

Then, at block 906, the merchant can scan the matrix bar code displayed by the client device. For example, the merchant could have a merchant terminal with a camera or other optical reader or scanner included, such as a bar code scanner. The merchant terminal could use the camera or optical reader or scanner to scan the matrix bar code.

Next, at block 909, the merchant can decode the information included in the matrix bar code, such as the account identifier of the user and the quantity of rewards points to be used, as well as any other information encoded in the matrix bar code. Once decoded, the merchant can, at block 913, request authentication from the server. As part of the authentication process, the merchant could provide the account identifier and quantity of rewards decoded from the matrix bar code.

At block 916, the server can authenticate the user and the quantity of rewards points. For example, the server could verify the account identifier is for a valid user account. The server could also verify that the quantity of rewards to be applied to the transaction is less than or equal to the current rewards point balance of the user. Once authenticated, the server could report back to the merchant that the account identifier is for a valid user account and that the user account has sufficient rewards points for the transaction. In some implementations, the server could also provide the merchant with additional information about the user associated with the account identifier, such as the status of the user with a partner of the merchant. For example, if the merchant were partnered with a local sports team, the server could provide an indication regarding whether the user were a season ticket holder for the sports team.

Then, at block 919, the merchant could calculate and apply a credit to the transaction based at least in part on the amount of rewards points identified in the matrix bar code. The value could be calculated using a formula, a sliding scale, or other factors such as the status of the user. The calculated value of the credit is then applied to the transaction (e.g., as a discount to the total purchase price).

Next, at block 923, the merchant completes the transaction and receives payment. Once the transaction is complete, the merchant sends a notification to the server. The notification can include the account identifier of the user, the quantity of rewards points applied to the transaction, and potentially other information.

At block 926, the server then updates the rewards points balance to reflect the transaction. For example, the server could deduct the quantity of rewards points reported by the merchant at block 923 from the total rewards points balance of the user.

Figure 9B:
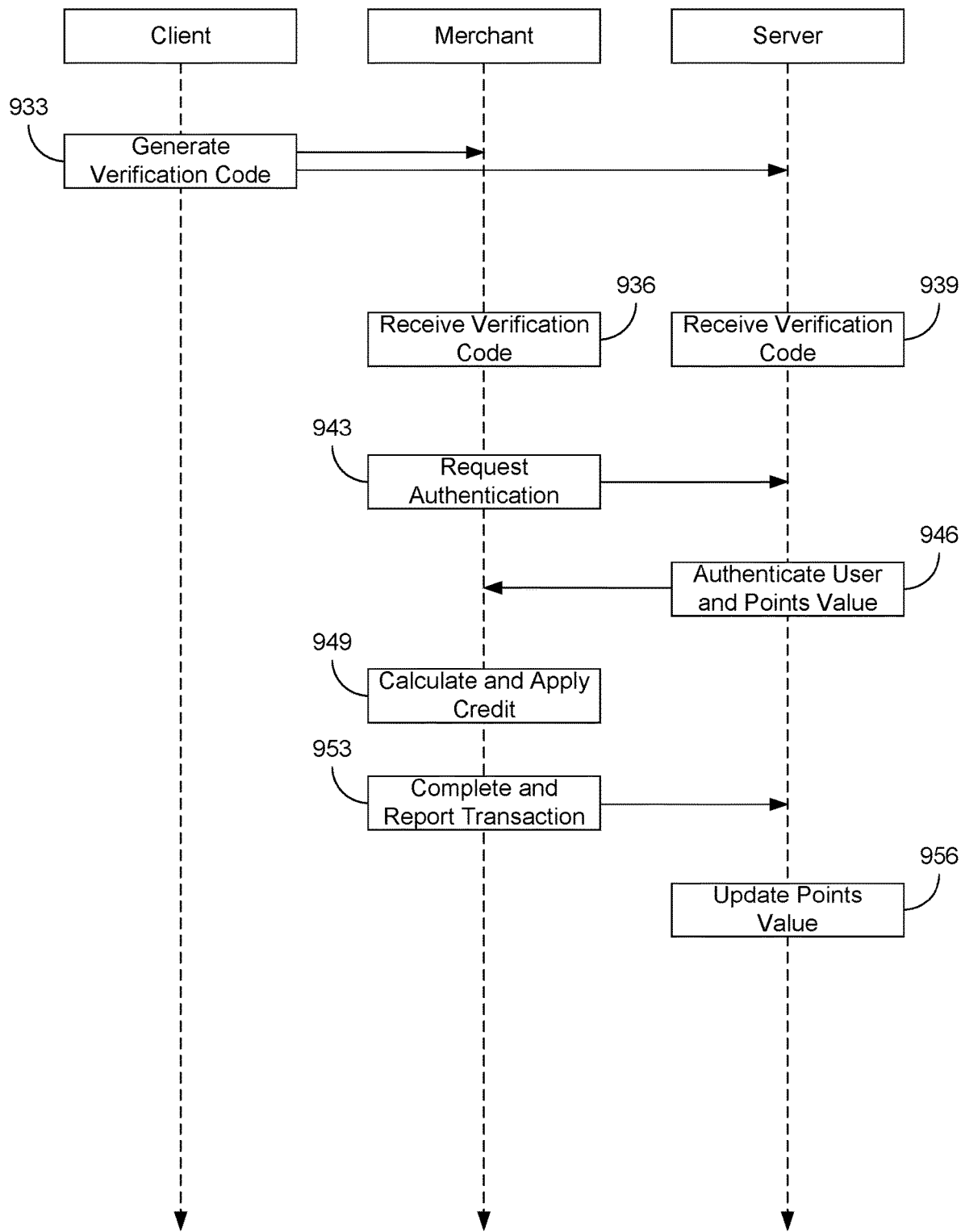

FIG. 9B depicts a sequence diagram illustrating an example implementation of various embodiments of the present disclosure. Here, FIG. 9B depicts a client, a server, and one or more systems operated by a merchant operating together to allow a user to redeem points earned using one or more of the previously described approaches.

Beginning at block 933, the client can generate a verification code (e.g., an alphanumeric code, a token, etc.) for use in a transaction with a merchant. The verification code can be used to verify the authenticity of the user. Once generated, the client can then provide the verification code to both the merchant and to the server.

Then, at block 936, the merchant can receive the verification code. For example, the user might input the verification code (e.g., if the verification code were an alphanumeric code) using a keypad of a payment or transaction terminal of the merchant. As another example, if the payment or transaction terminal contained a camera, the user might present the display to the camera of the payment or transaction terminal, which could use optical character recognition (OCR) to identify and obtain the verification code. As another example, the user could place his or her client device within range of the payment or transaction terminal and use NFC, BlueTooth, or another wireless protocol or transmitter to transmit the verification code (e.g., a token) to the merchant. In some implementations, the client could also send a user identifier in combination with the verification code to enable the merchant to perform subsequent authentications with the server.

In parallel, the server can also receive the verification code at block 939. For example, the client could have sent a copy of the verification code generated at block 933 to the server, which the server could use to subsequently authenticate the user at block 946. Accordingly, the client could also send a user identifier in combination with the verification code to enable the server to perform subsequent authentications.

Next, at block 943, the merchant can request authentication from the server. As part of the authentication process, the merchant could provide the account identifier, the verification code, and a quantity of rewards to be applied. The quantity of rewards to be applied could also have been provided by the client, for instance at block 933, or could have been separately provided or inputted by the user.

At block 946, the server can authenticate the user and the quantity of rewards points. For example, the server could verify the account identifier is for a valid user account and that the verification code matches a verification code previously provided to the server by the client. The server could also verify that the quantity of rewards to be applied to the transaction is less than or equal to the current rewards point balance of the user. Once authenticated, the server could report back to the merchant that the account identifier is for a valid user account and that the user account has sufficient rewards points for the transaction. In some implementations, the server could also provide the merchant with additional information about the user associated with the account identifier, such as the status of the user with a partner of the merchant. For example, if the merchant were partnered with a local sports team, the server could provide an indication regarding whether the user were a season ticket holder for the sports team.

Then, at block 949, the merchant could calculate and apply a credit to the transaction based at least in part on the amount of rewards points identified in the matrix bar code. The value could be calculated using a formula, a sliding scale, or other factors such as the status of the user. The calculated value of the credit is then applied to the transaction (e.g., as a discount to the total purchase price).

Next, at block 943, the merchant completes the transaction and receives payment. Once the transaction is complete, the merchant sends a notification to the server. The notification can include the account identifier of the user, the quantity of rewards points applied to the transaction, and potentially other information.

At block 946, the server then updates the rewards points balance to reflect the transaction. For example, the server could deduct the quantity of rewards points reported by the merchant at block 923 from the total rewards points balance of the user.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    a computing device comprising a processor and a memory; and
    machine-readable instructions stored in the memory that, when executed by the processor, cause the computing device to at least:
        capture, using a camera of the computing device, an image comprising a matrix bar code encoding an identifier for an event;
        identify a first time representing the time when the image is captured;
        receive an audio recording captured from a microphone that is attached to or is a component of the computing device;
        process the audio recording to identify an ultrasonic or subsonic signal that encodes the identifier an event being broadcast in a vicinity of the computing device;
        determine that the identifier encoded in the matrix bar code matches the identifier encoded in the ultrasonic or subsonic signal;
        in response to a determination that the identifier in the matrix bar code matches the identifier encoded in the ultrasonic or subsonic signal, generate a first indication of attendance of a user at an event, the first indication of attendance comprising the identifier of the event and the first time;
        report the first indication of the attendance of the user to a remote computing device;
        recapture, using the camera of the computing device, the image, the image comprising the identifier for the event;
        identify a second time representing the time when the image is recaptured;
        generate a second indication of the attendance of the user at the event, the second indication of the attendance comprising the identifier for the event and the second time; and
        report the second indication of the attendance of the user to the remote computing device.

2. The system of claim 1, wherein the machine-readable instructions that cause the computing device to obtain the first indication of attendance or the second indication of the attendance of the user at the event further cause the computing device to at least:
    identify a current location of the computing device using geolocation functionality provided by the computing device;
    identify a current time; and
    wherein the first indication of attendance or the current indication of attendance comprises both the current location of the computing device and the current time.

3. The system of claim 1, wherein the machine-readable instructions that cause the computing device to obtain the first indication of attendance or the second indication of the attendance of the user at the event further cause the computing device to at least:
    receive an audio or a video recording captured from a microphone or a camera attached to or a component of the computing device; and
    perform content recognition on the audio or the video recording to identify an event captured by the audio or the video recording.

4. The system of claim 1, wherein the image comprises a matrix bar code.

5. A method, comprising:
    capture, using a camera of a client device, an image comprising a matrix bar code encoding an identifier for an event;
    identifying, with a client device, a first time representing the time when the image is captured;
    receiving, with the client device, an audio recording captured from a microphone that is attached to or is a component of the computing device;
    processing, with the client device, the audio recording to identify an ultrasonic or subsonic signal that encodes the identifier an event being broadcast in a vicinity of the client device;
    determining, with the client device, that the identifier encoded in the matrix bar code matches the identifier encoded in the ultrasonic or subsonic signal;
    in response to determining that the identifier in the matrix bar code matches the identifier encoded in the ultrasonic or subsonic signal, generating, with the client device, a first indication of attendance of a user at an event, the first indication of attendance comprising the identifier of the event and the first time;
    reporting, with the client device, the first indication of the attendance of the user to a remote computing device;
    recapturing, using the camera of the client device, the image, the image comprising the identifier for the event;
    identifying, with the client device, a second time representing the time when the image is recaptured;

generating, with the client device, a second indication of the attendance of the user at the event, the second indication of the attendance comprising the identifier for the event and the second time; and reporting, with the client device, the second indication of the attendance of the user to the remote computing device.

6. The method of claim 5, wherein obtaining the first indication of attendance or the second indication of the attendance of the user at the event further comprises:

identifying, with the client device, a current location of the computing device using geolocation functionality provided by the computing device;

identifying, with the client device, a current time; and wherein the first indication of attendance or the current indication of attendance comprises both the current location of the computing device and the current time.

7. The method of claim 5, wherein obtaining the first indication of attendance or the second indication of the attendance of the user at the event further comprises:

creating an audio or a video recording with a microphone or a camera attached to or a component of the computing device; and performing, with the client device, content recognition on the audio or the video recording to identify an event captured by the audio or the video recording.

8. The method of claim 5, wherein the image comprises a matrix bar code.

9. The method of claim 5, wherein the client device is a smartphone.

10. A non-transitory, computer-readable medium comprising machine-readable instructions that, when executed by a processor of a client device, cause the client device to at least:

capture, using a camera of the client device, an image comprising a matrix bar code encoding an identifier for an event;

identify a first time representing the time when the image is captured;

receive an audio recording captured from a microphone that is attached to or is a component of the client device;

process the audio recording to identify an ultrasonic or subsonic signal that encodes the identifier an event being broadcast in a vicinity of the client device;

determine that the identifier encoded in the matrix bar code matches the identifier encoded in the ultrasonic or subsonic signal;

in response to a determination that the identifier in the matrix bar code matches the identifier encoded in the ultrasonic or subsonic signal, generate a first indication of attendance of a user at an event, the first indication of attendance comprising the identifier of the event and the first time;

report the first indication of the attendance of the user to a remote computing device;

recapture, using the camera of the client device, the image, the image comprising the identifier for the event;

identify a second time representing the time when the image is recaptured;

generate a second indication of the attendance of the user at the event, the second indication of the attendance comprising the identifier for the event and the second time; and report the second indication of the attendance of the user to the remote computing device.

11. The method of claim 10, wherein obtaining the first indication of attendance or the second indication of the attendance of the user at the event further comprises:

identifying, with the client device, a current location of the computing device using geolocation functionality provided by the computing device;

identifying, with the client device, a current time; and wherein the first indication of attendance or the current indication of attendance comprises both the current location of the computing device and the current time.

12. The method of claim 10, wherein obtaining the first indication of attendance or the second indication of the attendance of the user at the event further comprises:

creating an audio or a video recording with a microphone or a camera attached to or a component of the computing device; and performing, with the client device, content recognition on the audio or video recording to identify an event captured by the audio or video recording.

13. The method of claim 10, wherein the image comprises a matrix bar code.

14. The method of claim 10, wherein the client device is a smartphone.

* * * * *